United States Patent [19]

Giaccari

[11] Patent Number: 4,633,254
[45] Date of Patent: Dec. 30, 1986

[54] CIRCUIT ARRANGEMENT FOR POST-DETECTION SUPPRESSION OF SPURIOUS RADAR ECHOES

[75] Inventor: Ennio Giaccari, Rome, Italy

[73] Assignee: Selenia, Industrie Eletroniche Associate, S.p.A., Rome, Italy

[21] Appl. No.: 512,413

[22] Filed: Jul. 8, 1983

[30] Foreign Application Priority Data

Jul. 7, 1982 [IT] Italy .............................. 48782 A/82

[51] Int. Cl.⁴ ............................................ G01S 13/44
[52] U.S. Cl. ..................................... 342/91; 342/159
[58] Field of Search .................. 343/16 M, 7.7, 5 DP, 343/5 CF, 7 AG, 7 A

[56] References Cited

U.S. PATENT DOCUMENTS 3,149,333 9/1964 Campbell ......................... 343/7 AG
3,383,683 5/1968 Harriger et al. ..................... 343/7.7
3,727,221 4/1973 Julier et al. ................... 343/16 M X
3,781,882 12/1973 Holberg ............................ 343/7.7 X
4,095,222 6/1978 Mooney, Jr. ................. 343/5 CF X
4,137,532 1/1979 Taylor, Jr. et al. .................. 343/7.7

Primary Examiner—T. H. Tubbesing
Assistant Examiner—Mark Hellner
Attorney, Agent, or Firm—Karl F. Ross; Herbert Dubno

OTHER PUBLICATIONS

Skolnik, Introduction to Radar Systems, 1980, McGraw Hill, pp. 160–162.

[57] ABSTRACT

A radar, e.g. as used for the surveillance of aerial navigation, has a receiver feeding incomimg echo signals to several Doppler filters in parallel, the output signal of each filter beign passed to a utilization stage through a respective attenuator connected to the filter output in parallel with an associated area processor. The latter comprises a pulse counter synchronized with the scanning motion of the radar antenna to register the number of echoes received in successive sweeps from different zones into which the surveyed space is divided in distance and azimuth. Upon the last sweep of a sector encompassing a group of such zones, the contents of respective cells of a sector memory loaded by the pulse counter are compared with a first threshold. If the number of echoes stored in such a cell exceeds that threshold, a count written in an assigned cell of a scan memory is incremented; if it does not, the count is decremented. A delayed reading of the scan memory, during a subsequent antenna rotation, determines the setting of the associated attenuator during the sweep of any zone. The attenuator includes a delay line from which the signal amplitudes appearing in the output of the corresponding Doppler filter during recurrent sweeps of the same zone are simultaneously recovered and averaged; the result is multiplied by a factor selected by comparison with a second threshold in the associated area processor on the basis of the numerical value read out from the corresponding cell of the scan memory.

8 Claims, 5 Drawing Figures

CIRCUIT ARRANGEMENT FOR POST-DETECTION SUPPRESSION OF SPURIOUS RADAR ECHOES

FIELD OF THE INVENTION

My present invention relates to a circuit arrangement for suppressing, after detection, spurious echoes intercepted by a continuously scanning receiving antenna of a monopulse radar.

BACKGROUND OF THE INVENTION

In the periodic scanning of a certain space in range and azimuth, by an antenna of a monopulse radar feeding incoming echoes to a two-dimensional display screen, problems are often encountered on account of spurious pulses due to so-called "angel echoes" caused by a variety of reflecting objects whose presence is of no interest to the observer. Thus, for example, the monitoring of aircraft in an aerial-navigation system will be impeded by such spurious reflectors as surface vehicles, flights of birds, updrafts of warm air, evaporation from large bodies of water and other atmospheric phenomena. Though the well-known moving-target indicators (MTI) blank out stationary objects, this technique is not effective against false targets moving at low or moderate speeds in a radial direction as seen from a control tower or other observation post equipped with such a radar.

These spurious reflectors are generally characterized by rather limited absolute velocities (on the order of tens of kilometers per hour) and a fairly dense but nonuniform spatial distribution. The resulting "angel echoes" may exhibit low-frequency fluctuations (on the order of tens of Hz) and slow overall variations with time; their signal-to-noise ratio (SNR) may be comparable to that of small aircraft having reflecting surfaces of several square meters.

The usual solutions for dealing with the problem of "angels" are designed to modify the amplification of incoming echo pulses, as by the known STC (sensitivity time control) system, or the elevational angle of the antenna beam. Since, however, the locations of the spurious reflectors within the surveyed space are not in advance, these modifications cannot be localized in range or in azimuth and therefore also affect the true echo signals. Radar receivers of the so-called CFAR (constant false-alarm rate) type implement a not entirely satisfactory compromise between the needs for a comprehensive surveillance and the desire to minimize interference from spurious echoes. Manually setting the rates of amplification or attenuation for pulses received from different range bins, on the basis of visul observation of cluttered areas on the screen, is a somewhat cumbersome procedure liable to distract the attention of the operator.

OBJECTS OF THE INVENTION

The general object of my present invention, therefore, is to provide a circuit arrangement for automatically and effectively suppressing, in the signal channel of a radar receiver, spurious echoes localized in both range and azimuth.

A more particular object is to provide means in such a circuit arrangement for discriminating against incoming pulses having the aforestated characteristics of "angel" echoes, especially as concerns radial velocity and temporal persistance.

SUMMARY OF THE INVENTION

In accordance with my present invention, the space periodically scanned by a radar antenna is conceptually divided in azimuth into a multiplicity of angular sectors each encompassing a multiplicity of zones—also termed range bins—from which echoes of outgoing radar pulses are successively received in the course of a range sweep, each sector encompassing a predetermined number of such sweeps marked by the emission of outgoing radar pulses whose incoming echoes are supplied to a receiver for conversion into signals that are fed to a load indicating the position of a pulse-reflecting target. Inserted between the receiver and the load is a suppressor of spurious echoes comprising Doppler-filter means connected to the receiver for generating an output pulse in the presence of an incoming echo from a target with a radial velocity lying in a predetermined speed range. I further provide adjustable attenuation means interposed between the Doppler-filter means and the load, the attenuation means being connected to the filter means in parallel with processing means serving to determine the number of output pulses generated in the sweeping of each zone and to adjust the attenuation means. This adjustment is designed to reduce the amplitudes of output pulses passed to the load, in response to echoes originating at a given zone, with increasing density of the echoes from such zone.

Generally, and in accordance with the preferred embodiment described hereinafter, the Doppler-filter means comprises a plurality of individual Doppler filters connected in parallel to the receiver for generating respective output pulses in response to echoes from targets whose radial velocities lie in different speed ranges. The attenuation and processing means are similarly subdivided so that each Doppler filter works into its own attenuator and processer in parallel.

With suitable design or adjustment of the several Doppler filters, therefore, the suppression of incoming echoes will be limited to those originating at potentially spurious reflectors or "angels" but will not affect other, presumably legitimate targets to be located by the radar, such as aircraft coming toward or moving away from an observation post at high radial speeds.

Pursuant to a more particular feature of my invention, each processor comprises storage means for registering separate pulse counts for all the zones of a sector, first comparison means operative upon the last sweep of a sector to compare each pulse count registered in the storage means with a predetermined first threshold, memory means coupled to the first comparison means and provided with a multiplicity of cells for the preservation of an indication of pulse density of respective zones on the basis of the relationship of the corresponding pulse counts with the first threshold, and second comparison means connected to the memory means for readjusting the associated attenuator during its traversal by an output pulse due to an echo from a given zone. The latter adjustment is based on the relationship of the contents of the corresponding cell with a predetermined second threshold; the contents of all cells assigned to the zones of a given sector are updated on the last sweep of that sector during recurrent antenna scans.

Pursuant to a further feature of my invention, the memory means of each processor is provided with accumulator means for incrementing the contents of a given cell thereof whenever the corresponding pulse count exceeds the first threshold but otherwise decrementing these contents on the last sweep of the corresponding sector.

Pursuant to yet another feature of my invention, each attenuator advantageously comprises a delay line with a multiplicity of taps spaced apart for the simultaneous emission of output pulses due to echoes received from one and the same zone or range bin during different sweeps, these taps being connected to averaging means for determining a mean amplitude of the simultaneously emitted output pulses. With the aid of arithmetic means forming part of each attenuator, the mean amplitide thus obtained is multiplied with a corrective factor and the resulting product is subtracted from the magnitudes of output pulses transmitted to the load, this corrective factor being selected under the control of the second comparison means of the associated processor.

BRIEF DESCRIPTION OF THE DRAWING

The above and other features of my invention will now be described in detail with reference to the accompanying drawing in which.

SPECIFIC DESCRIPTION

Figure 3:
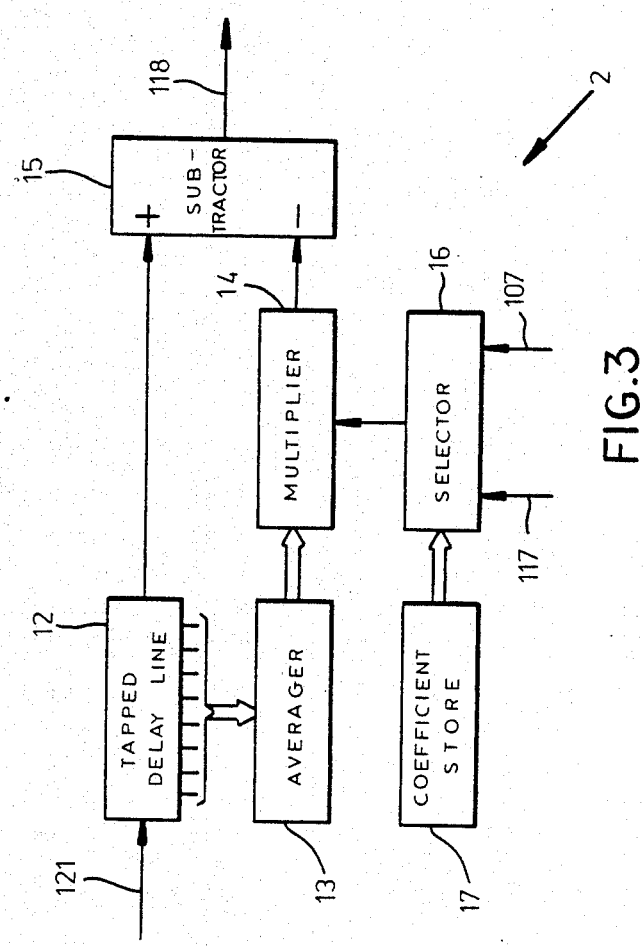
FIG. 3 is a similarly detailed diagram of an attenuator included in the same echo suppressor.
Figure 4:
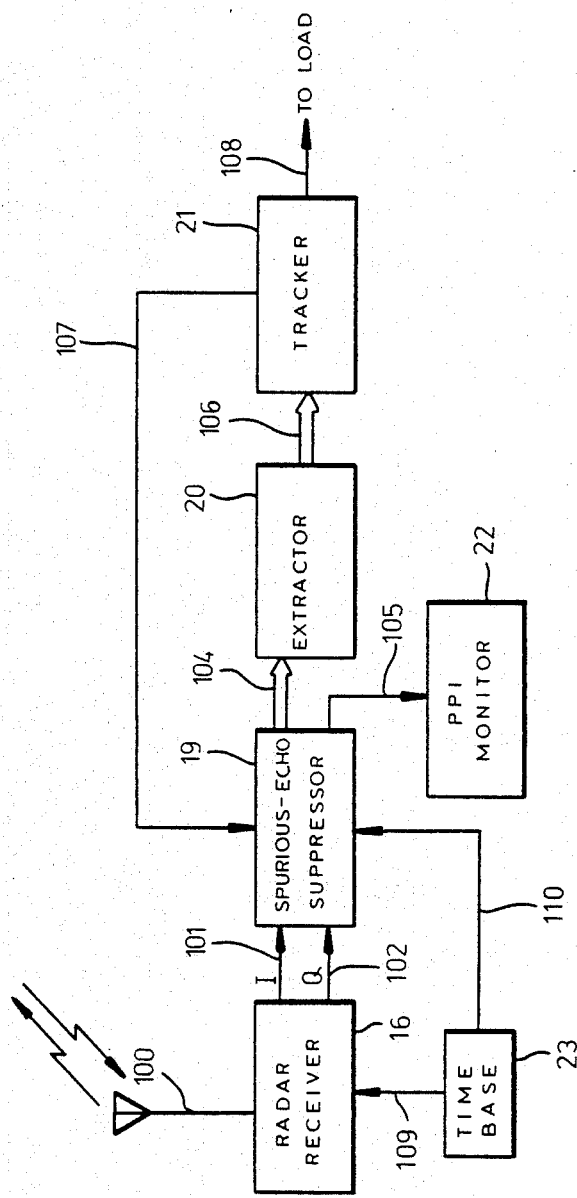
FIG. 4 is an overall block diagram of a radar including the echo suppressor of FIG. 1.

Reference will first be made to FIG. 4 showing part of a conventional radar which may be used, for example, in monitoring aerial navigation in the region of an airport. An antenna 100, which could be of the mechanically or electronically scanning type, transmits outgoing radar pulses in a succession of range sweeps and intercepts incoming echoes which are fed to a radar receiver 16. Two output channels 101 and 102 of receiver 16 carry in-phase signals I and quadrature signals Q, respectively, derived from the incoming echoes. These signals are delivered to a spurious-echo suppressor 19 according to my invention, more fully discussed hereinafter with reference to FIGS. 1-3, which has an output lead 105 extending to a PPI (plan position indicator) monitor 22 designed to display the locations of detected targets on an observation screen. Another output connection 104 of suppressor 19 terminates at a signal extractor 20 coupled with a tracking stage 21 via a connection 106. In the tracking mode, suppressor 19 is controlled by stage 21 through a feedback connection 107. Stage 21 also has an output connection 108 leading to a load not further illustrated. A time base 23 controls the receiver 16 and the echo suppressor 19 by way of respective lines 109 and 110, along with the nonillustrated transmitting stage of the radar.

Figure 5:
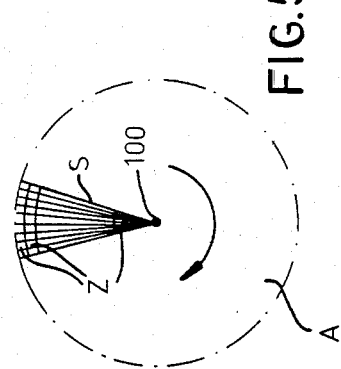
FIG. 5 is a plot of the space surveyed by the radar of FIG. 4, illustrating its conceptual subdivision into sectors and zones.

The beam of antenna 100 is assumed to rotate continuously to scan a circular area A, FIG. 5, which is conceptually subdivided into a multiplicity of identical angular sectors, one of them being indicated at S. Each sector, in turn, in conceptually subdivided into a multiplicity of range bins or zones, some of which are shown at Z. It will be understood that the number of range bins or zones is limited by the pulse width and the resolution capacity of the receiver; in a specific instance there may be 64 sectors S each includes 32 zones Z. Each sector further encompasses a multiplicity of range sweeps whereby any target located in a given zone Z is struck by several outgoing pulses in the course of an antenna scan, returning as many echoes to the receiver 16 of FIG. 4.

Figure 1:
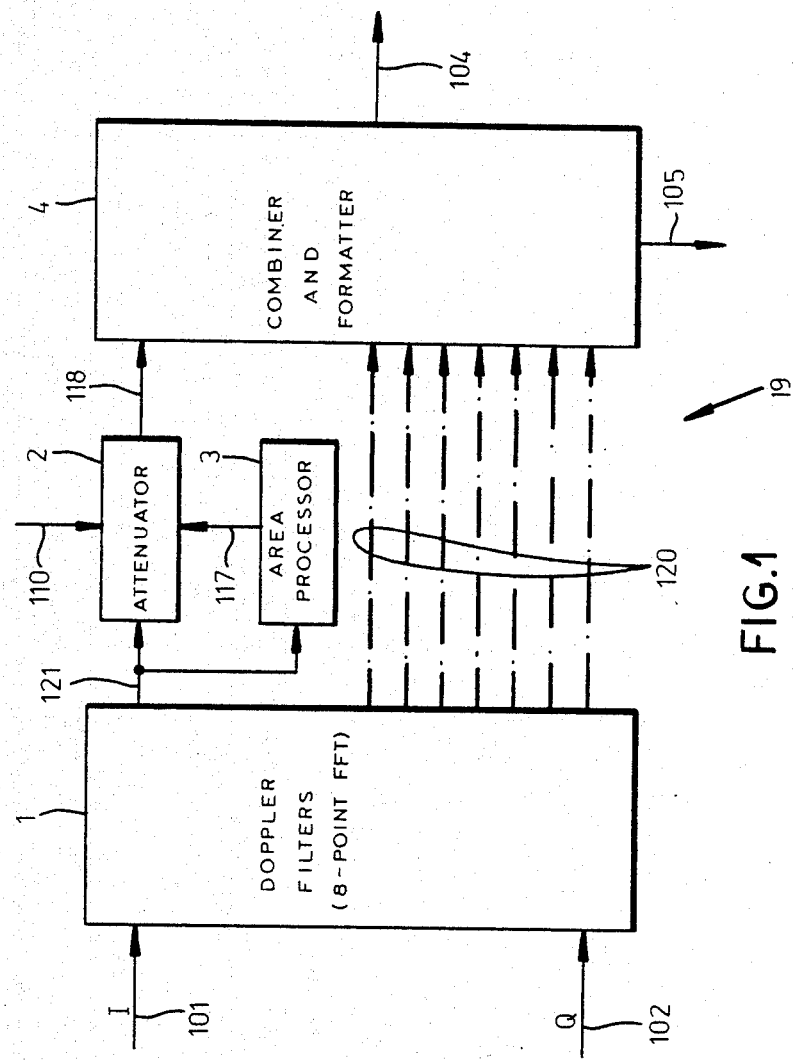
FIG. 1 is a block diagram of a spurious-echo suppressor embodying my invention.

As indicated in FIG. 1, the echo suppressor 19 comprises a set of Doppler filters with inputs connected in parallel to receiver outputs 101 and 102. These filters may be of the 8-point FFT (fast Fourier transform) type with a high degree of frequency selectivity, preferably discriminating by at least 40 dB against frequencies lying outside their assigned bands. Each Doppler filter has an output channel 120 individually linking it to an evaluation stage 4 which combines the output signals from the several filters in an orderly manner into a format suitable for transmission to extractor 20 and PPI monitor 22 (FIG. 4) via the respective signal paths 104 and 105.

As particularly illustrated for the uppermost Doppler filter in FIG. 1, each channel 120 comprises an attenuator 2 and an area processor 3 connected in parallel to an output lead 121 of the associated filter. Attenuator 2, which has an output lead 118 extending to an evaluation stage 4, receives control signals from processor 3 by way of a lead 117 and is also connected to time base 23 (FIG. 4) via line 110.

Some of the leads shown in FIGS. 1-4 represent line multiples as will be apparent from the description given in connection therewith.

Figure 2:
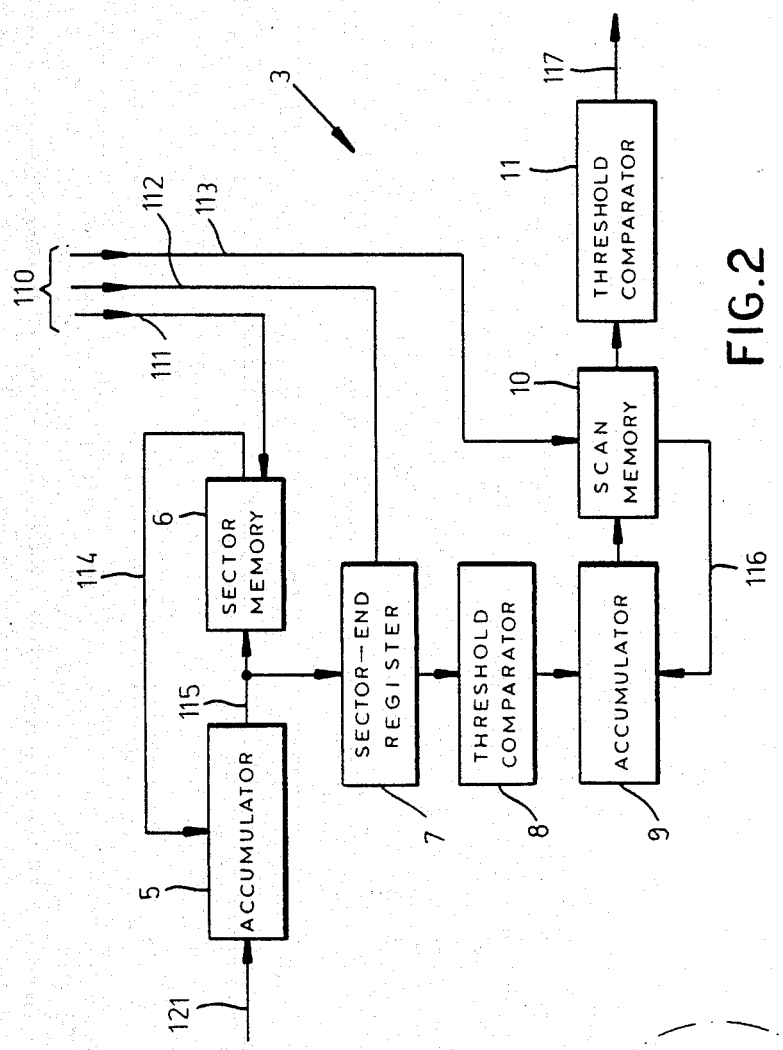
FIG. 2 is a more detailed diagram of an area processor forming part of the echo suppressor of FIG. 1.

In FIG. 2 I have shown details of area processor 3 which comprises an accumulator 5 receiving via lead 121 the output pulses of the associated Doppler filter. Accumulator 5 is connected by a line 115 to a sector memory 6 as well as to a sector-end register 7. Register 7 is connected to a threshold comparator 8 working into another accumulator 9 associated with a scan memory 10. Another threshold comparator 11 is inserted between memory 10 and the output lead 117 of this processor. Line 110, which extends from time base 23 of FIG. 4, comprises three leads 111, 112 and 113 respectively terminating at sector memory 6, sector-end register 7 and scan memory 10. A feedback connection extends from memory 6 to accumulator 5 while a similar connection 116 goes from memory 10 to accumulator 9.

Memory 6 is assumed to have 32 cells, one for each zone Z into which a sector S (FIG. 5) is divided. During the scan of any sector, pulses arriving on lead 121 from the associated Doppler filter are loaded by way of accumulator 5 into cells of memory 6 addressed by connection 111 and assigned to respective range bins from which the echoes giving rise to these pulses have originated. When the same range bin generates another echo during a subsequent sweep, accumulator 5 updates the pulse count stored in the corresponding memory cell.

When the antenna signal leaves a sector, time base 23 enables the register 7 by a signal on lead 112 to store a pulse count corresponding to that in each cell of memory 6 derived from the pulse count then present on respective wire groups forming part of line multiple 115; memory 6 is cleared immediately thereafter. If the pulse count of any memory cell exceeds a predetermined threshold as determined by a comparator 8, accumulator 9 increments by one a count stored in a corresponding cell of scan memory 10 enabled for writing by a signal on lead 113. If the threshold of comparator 8 is not exceeded by the contents of a cell of memory 6 allocated to a given zone, the contents of the corresponding cell of scan memory 10 are decremented by one at that instant. Thus, memory 10 has as many cells (32×64 in the example assumed) as there are zones in all the sectors of the surveyed space A; these cells, of course, are addressed in the proper sequence via connection 113. The maximum count adapted to be stored in any cell of memory 10 is limited to prevent an overflow; the lower limit of such a count may be zero or, possibly, a predetermined negative value.

The cells of memory 10 assigned to a particular sector S are read, again under the control of time base 23, when the scan of the antenna returns to the same sector after nearly a full revolution so that their pulse counts are available on connection 117 when echoes from the corresponding zones are again received. Pulses generated by such echoes in the output of the associated Doppler filter, i.e. on lead 121, are also fed to a tapped delay line 12 forming part of attenuator 2 as shown in FIG. 3. The taps of line 12 are connected to an averager 13 which determines the mean amplitude of the pulses simultaneously present at different points of that delay line, these points being so spaced from one another that the signal amplitudes concurrently present thereon are due to echoes reflected from the same zone during consecutive sweeps. The number of these taps may be a fraction of the number of range sweeps per sector. The mean amplitude digitally computed by averager 13 is delivered to a multiplier 14 whose output, together with that of delay line 12, extends to a subtractor 15. A selector 16, connected to another input of multiplier 14, is controlled by the output 117 of threshold comparator 11 (FIG. 2) to apply to multiplier 14 one of several coefficients of predetermined values stored in a block 17. Thus, the signal amplitude generated by averager 13 is modified in arithmetic unit 14 by multiplication with a coefficient—generally a fractional factor—extracted from a store 17 in accordance with the value emitted by threshold comparator 11. Subtractor 15 reduces the amplitude of a signal pulse from the associated filter output, traversing delay line 12, by the value calculated in multiplier 14; this subtrahend, therefore, will vary for a given mean amplitude roughly in proportion to the amount by which the pulse count stored in a corresponding cell of scan memory 10 (FIG. 2) surpasses the threshold of comparator 11. When the threshold is not surpassed, the multiplying factor may be zero. A relatively brief increase in the pulse density of a given range bin, which could be atypical of "angel echoes", therefore does not significantly augment the attenuation of pulse scans relating to that range bin.

FIG. 3 also shows that selector 16 may be alternatively controlled by signals on lead 107 generated at stage 21 in a tracking mode in which the processor 3 will be ineffectual.

I claim:

1. In a monopulse radar for the surveillance of a space conceptually divided in azimuth into a multiplicity of angular sectors each encompassing a multiplicity of zones from which echoes of outgoing radar pulses are successively receivable in the course of a range sweep, each sector encompassing a predetermined number of sweeps, said space being periodically scanned by an antenna supplying incoming echoes to a receiver for conversion into signals fed to a load to indicate the position of a pulse-reflecting target, the combination therewith of a suppressor of spurious echoes inserted between said receiver and said load, said suppressor comprising:

Doppler-filter means connected to said receiver for generating an output pulse in the presence of an incoming echo from a target with a radial velocity lying in a predetermined speed range:

adjustable attenuation means interposed between said Doppler-filter means and said load; and processing means connected to said Doppler-filter means in parallel with said attenuation means for determining the number of output pulses generated in the sweeping of each zone and adjusting said attenuation means to reduce the amplitudes of output pulses passed to said load, in response to echoes originating at a given zone, with increasing density of the echoes from said given zone, wherein said processing means comprises storage means for registering separate pulse counts for all the zones of a sector; first comparison means operative upon the last sweep of a sector to compare each pulse count registered in said storage means with a predetermined first threshold; memory means coupled to said first comparison means and provided with a multiplicity of cells for the preservation of an indication of pulse density of respective zones based upon the relationships of the corresponding pulse counts with said first threshold, the contents of all cells assigned to the zones of a given sector being updated on the last sweep of the same sector during recurrent antenna scans; and second comparison means connected to said memory means for readjusting said attenuation means, during traversal thereof by an output pulse due to an echo from a given zone, on the basis of the relationship of the contents of the corresponding cell with a predetermined second threshold.

2. In a monopulse radar for the surveillance of a space conceptually divided in azimuth into a multiplicity of angular sectors each encompassing a multiplicity of zones from which echoes of outgoing radar pulses are successively receivable in the course of a range sweep, each sector encompassing a predetermined number of sweeps, said space being periodically scanned by an antenna supplying incoming echoes to a receiver for conversion into signals fed to a load to indicate the position of a pulse-reflecting target, the combination therewith of a suppressor of spurious echoes inserted between said receiver and said load, said suppressor comprising:

Doppler-filter means connected to said receiver for generating an output pulse in the presence of an incoming echo from a target with a radial velocity lying in a predetermined speed range;

adjustable attenuation means interposed between said Doppler-filter means and said load; and processing means connected to said Doppler-filter means in parallel with said attenuation means for determining the number of output pulse generated in the sweeping of each zone and adjusting said attenuation means to reduce the amplitudes of output pulses passed to said load, in response to echoes originating at a given zone, with increasing density of the echoes from said given zone, wherein said processing means comprises storage means for registering separate pulse counts for all the zones of a sector; first comparison means operative upon the last sweep of a sector to compare each pulse count registered in said storage means with a predetermined first threshold; memory means coupled to said first comparison means and provided with a multiplicity of cells for the preservation of an indication of pulse density of respective zones based upon the relationships of the corresponding pulse counts with said first threshold, the contents of all cells assigned to the zones of a given sector being updated on the last sweep of the same sector during recurrent antenna scans; and second comparison means connected to said memory means for readjusting said attenuation means, during traversal thereof by an output pulse due to an echo from a given zone, on the basis of the relationship of the contents of the corresponding cell with a predetermined second threshold and wherein said memory means is provided with accumulator means for incrementing the contents of a given cell thereof upon the corresponding pulse count exceeding said first threshold and otherwise decrementing said contents on the last sweep of the corresponding sector.

3. In a monopulse radar for the surveillance of a space conceptually divided in azimuth into a multiplicity of angular sectors each encompassing a multiplicity of zones from which echoes of outgoing radar.pulse are successively receivable in the course of a range sweep, each sector encompassing a predetermined number of sweeps, said space being periodically scanned by an antenna supplying incoming echoes to a receiver for conversion into signals fed to a load to indicate the position of a pulse-reflecting target, the combination therewith of a suppressor of spurious echoes inserted between said receiver and said load, said suppressor comprising:

Doppler-filter means connected to said receiver for generating an output pulse in the presence of an incoming echo from a target with a radial velocity lying in a predetermined speed range;

adjustable attenuation means interposed between said Doppler-filter means and said load, wherein said attenuation means comprises a delay line with a multiplicity of taps spaced apart for the simultaneous emission of output pulses due to echoes received from one and the same zone during different sweeps, averaging means connected to said taps for determining a mean amplitude of the simultaneously emitted output pulses, and arithmetic means for multiplying said mean amplitude with a corrective factor and subtracting the resulting product from the magnitudes of output pulses transmitted to said load, said corrective factor being selected under the control of said second comparison means;

processing means connected to said Doppler-filter means in parallel with said attenuation means for determining the number of output pulses generated in the sweeping of each zone and adjusting said attenuation means to reduce the amplitudes of output pulses passed to said load, in response to echoes originating at a given zone, with increasing density of the echoes from said given zone, and wherein said processing means comprises storage means for registering separate pulse counts for all the zones of a sector; first comparison means operative upon the last sweep of a sector to compare each pulse count registered in said storage means with a predetermined first threshold; memory means coupled to said first comparison means and provided with a multiplicity of cells for the preservation of an indication of pulse density of respective zones based upon the relationships of the corresponding pulse counts with said first threshold, the contents of all cells assigned to the zones of a given sector being updated on the last sweep of the same sector during recurrent antenna scans; and second comparison means connected to said memory means for readjusting said attenuation means, during traversal thereof by an output pulse due to an echo from a given zone, on the basis of the relationship of the contents of the corresponding cell with a predetermined second threshold.

4. In a monopulse radar for the surveillance of a space conceptually divided in azimuth into a multiplicity of angular sectors each encompassing a multiplicity of zones from which echoes of outgoing radar pulses are successively receivable in the course of a range sweep, each sector encompassing a predetermined number of sweeps, said space being periodically scanned by an antenna supplying incoming echoes to a receiver for conversion into signals fed to a load to indicate the position of a pulse-reflecting target, the combination therewith of a suppressor of spurious echoes inserted between said receiver and said load, said suppresor comprising:

Doppler-filter means connected to said receiver for generating an output pulse in the presence of an incoming echo from a target with a radial velocity lying in a predetermined speed range;

adjustable attenuation means interposed between said Doppler-filter means and said load, wherein said attenuation means comprises a delay line with a multiplicity of taps spaced apart for the simultaneous emission of output pulses due to echoes received from one and the same zone during different sweeps, averaging means connected to said taps for determining a mean amplitude of the simultaneously emitted output pulses, and arithmetic means for multiplying said mean amplitude with a corrective factor and subtracting the resulting product from the magnitudes of output pulses transmitted to said load, said corrective factor being selected under the control of said second comparison means;

processing means connected to said Doppier-filter means in parallel with said attenuation means for determining the number of output pulses generated in the sweeping of each zone and adjusting said attenuation means to reduce the amplitudes of ouput pulses passed to said load, in response to echoes originating at a given zone, with increasing density of the echoes from said given zone;

wherein said processing means comprises storage means for registering separate pulse counts for all the zones of a sector; first comparison means operative upon the last sweep of a sector to compare each pulse count registered in said storage means with a predetermined first threshold; memory means coupled to said first comparison means and provided with a multiplicity of cells for the preservation of an indication of pulse density of respective zones based upon the relationships of the corresponding pulse counts with said first thresholds, the contents of all cells assigned to the zones of a given sector being updated on the last sweep of the same sector during recurrent antenna scans; and second comparison means connected to said memory means for readjusting said attenuation means, during traversal thereof by an output pulse due to an echo from a given zone, on the basis of the relationship of the contents of the corresponding cell with a predetermined second threshold; and target-tracking means controlled by said output pulses and provided with a feedback connection extending to said attenuation means for replacing said second comparison means in determining the selection of said corrective factor.

5. The combination defined in claim 1 wherein said Doppler-filter means comprises a plurality of Doppler filters connected in parallel to said receiver for generating respective output pulses in response to echoes from targets whose radial velocities lie in different speed ranges, said attenuation means and processing means comprising a plurality of attenuators connected in parallel with as many processors to the outputs of respective Doppler filters.

6. The combination defined in Claim 2 wherein said Doppler-filter means comprises a plurality of Doppler filters connected in parallel to said receiver for generating respective output pulses in reponse to echoes from targets whose radial velocities lie in different speed ranges, said attenuation means and processing means comprising a plurality of attenuators connected in parallel with as many processors to the outputs of respective Doppler filters.

7. The combination defined in claim 3 wherein said Doppler-filter means comprises a plurality of Doppler filters connected in parallel to said receiver for generating respective output pulses in response to echoes from targets whose radial velocities lie in different speed ranges, said attenuation means and processing means further comprising a plurality of attenuators connected in parallel with as many processors to the outputs of respective Doppler filters.

8. The combination defined in claim 4 wherein said Doppler-filter means comprises a plurality of Doppler filters connected in parallel to said receiver for generating respective output pulses in response to echoes from targets whose radial velocities lie in different speed ranges, said attenuation means and processing means further comprising a plurality of attenuators connected in parallel with as many processors to the outputs of respective Doppler filters.

* * * * *